US012277702B2

(12) United States Patent
Ito

(10) Patent No.: US 12,277,702 B2
(45) Date of Patent: Apr. 15, 2025

(54) RADIOGRAPHIC FAILURE DETERMINATION SUPPORT DEVICE AND RECORDING MEDIUM

(71) Applicant: Konica Minolta, Inc., Tokyo (JP)

(72) Inventor: Ryohei Ito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 516 days.

(21) Appl. No.: 17/684,761

(22) Filed: Mar. 2, 2022

(65) Prior Publication Data

US 2022/0284573 A1 Sep. 8, 2022

(30) Foreign Application Priority Data

Mar. 2, 2021 (JP) ................................. 2021-032474

(51) Int. Cl.
G06T 7/00 (2017.01)
G01T 7/00 (2006.01)

(52) U.S. Cl.
CPC .............. *G06T 7/0012* (2013.01); *G01T 7/00* (2013.01); *G06T 2207/10116* (2013.01); *G06T 2207/30004* (2013.01); *G06T 2207/30168* (2013.01)

(58) Field of Classification Search
CPC .......... H04N 25/68; H04N 23/30; H04N 5/32; A61B 6/032; A61B 6/06; A61B 6/405; A61B 6/482; A61B 6/4291; G21K 1/10; G21K 1/02
See application file for complete search history.

(56) References Cited

U.S. PATENT DOCUMENTS

| | | | | |
|---|---|---|---|---|
| 6,990,171 B2* | 1/2006 | Toth | ....................... | A61B 6/032 378/158 |
| 7,068,751 B2* | 6/2006 | Toth | ....................... | A61B 6/469 378/20 |
| 7,313,217 B2* | 12/2007 | Toth | ....................... | A61B 6/488 378/205 |
| 7,480,363 B2* | 1/2009 | Lasiuk | ................. | G01B 15/025 378/54 |
| 7,623,728 B2* | 11/2009 | Avinash | ................... | G06T 5/70 382/173 |
| 7,773,831 B2* | 8/2010 | Cresens | .................... | G06T 5/20 345/670 |

(Continued)

FOREIGN PATENT DOCUMENTS

| | | | |
|---|---|---|---|
| JP | 3349004 B2 | 11/2002 | |
| JP | 2003209746 A | 7/2003 | |

(Continued)

OTHER PUBLICATIONS

JPO Notice of Reasons for Refusal for corresponding JP Application No. 2021-032474; Issued Sep. 10, 2024.

*Primary Examiner* — Yosef Kassa
(74) *Attorney, Agent, or Firm* — CANTOR COLBURN LLP

(57) ABSTRACT

A radiographic failure determination support device includes a determiner and a notifier. The determiner makes a determination about whether a signal saturation region is present in a radiation image captured by radiographing a subject. In a case in which the determiner determines that the signal saturation region is present in the radiation image, the notifier notifies a user that the signal saturation region is present in the radiation image.

11 Claims, 12 Drawing Sheets

(56) References Cited

U.S. PATENT DOCUMENTS

| | | | | |
|---|---|---|---|---|
| 7,860,208 B2* | 12/2010 | Haerer | ............... | G06T 5/73 |
| | | | | 378/7 |
| 7,929,030 B2* | 4/2011 | Sugizaki | ............ | H04N 25/68 |
| | | | | 348/241 |
| 8,121,372 B2* | 2/2012 | Harer | ............... | G06V 10/30 |
| | | | | 378/62 |
| 8,194,821 B2* | 6/2012 | Seppi | ............... | G21K 1/10 |
| | | | | 378/62 |
| 8,218,721 B2* | 7/2012 | Raupach | ............ | A61B 6/032 |
| | | | | 378/150 |
| 8,946,634 B2* | 2/2015 | Watano | ............. | G01T 1/16 |
| | | | | 250/370.15 |
| 2021/0035285 A1 | 2/2021 | Sainz De Cea et al. | | |

FOREIGN PATENT DOCUMENTS

| | | | |
|---|---|---|---|
| JP | 2015204921 A | 11/2015 | |
| JP | 649548 B2 | 11/2018 | |

* cited by examiner

FIG.6B

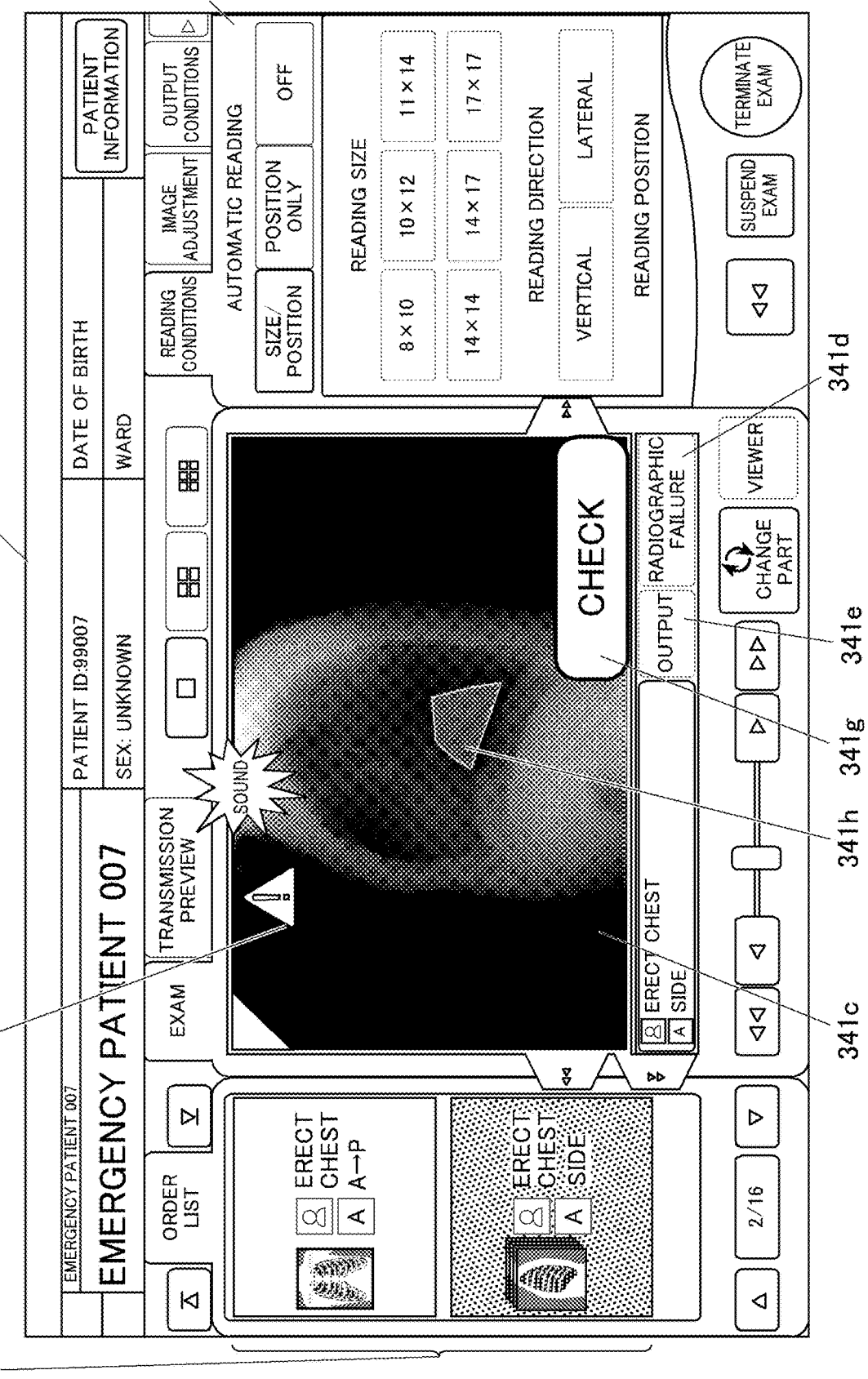

RADIOGRAPHIC FAILURE DETERMINATION SUPPORT DEVICE AND RECORDING MEDIUM

CROSS REFERENCES TO RELATED APPLICATIONS

The present invention claims priority under 35 U.S.C. § 119 to Japanese Application, 2021-032474, filed on Mar. 2, 2021, the entire contents of which being incorporated herein by reference.

1. Technological Field

The present invention relates to a radiographic failure determination support device and a recording medium.

2. Description of the Related Art

In the medical field, radiation images captured by irradiating subjects with radiation and detecting radiation having passed through the subjects with a radiation detector (sensor) are utilized for diagnosis. A reached dose that reaches the radiation detector and a signal value of the radiation detector have a relation that linearity is kept until the reached dose exceeds a certain threshold value (saturation dose), while linearity degrades when the reached dose exceeds the certain threshold value, and the signal value gradually approaches a constant value, as shown in FIG. 1. A pixel where a dose that exceeds the saturation dose has reached is called a saturation pixel. In a radiation image, a high density region (high signal value region) corresponding to a region where a larger number of saturation pixels than predetermined pixels are present densely is called a signal saturation region (hereinafter, abbreviated to a saturation region). Disadvantageously, accurate information about a subject is not obtained in the saturation region, which affects diagnosis.

JP 3349004B, for example, describes an X-ray image measuring device including means for dividing an unsaturated blank region and a saturated blank region from a subject image including blank regions, means for calculating a difference between the subject image having been subjected to logarithmic conversion and a shading image having been subjected to logarithmic conversion, means for setting a pixel value of the unsaturated blank region based on the difference value, and means for converting a pixel value of the saturated blank region into the set pixel value.

JP 2003-209746A, for example, describes a radiography device in which, in a state where a sensor output corresponding to each pixel does not saturate or overflow, output of its stationary region is used, and when the sensor output saturates or overflows, an estimated output in the saturation or overflow region is calculated from rising of the sensor output before and after the occurrence of saturation or overflow or a signal of an attenuation region, and the stationary output and estimated output are synthesized to generate image data.

JP 6429548B, for example, describes an image processing device that performs image processing on a radiographed image radiographed by using a plurality of image sensors, the image processing device including a separator that separates the radiographed image into a plurality of band restricted images restricted to frequency bands different from each other, a detector that detects, for the radiographed image, a pixel in which an incident dose on an image sensor is more than or equal to a predetermined value as a saturation pixel, an adjuster that adjusts contrast of a partial image including saturation pixels of the band restricted images, and a reconfigurer that reconfigures an image using a plurality of the band restricted images whose contrast has been adjusted.

In JP 3349004B, JP 2003-209746A, and JP 6429548B, a signal value of a saturation region is corrected. However, once correction is performed, a radiographer (user) is unable to recognize whether a saturation region has been present in the radiographed radiation image. Thus, the radiographer is unable to recognize whether radiography has been performed at an appropriate dose, which does not lead to improvement of radiographic conditions for subsequent radiography sessions.

SUMMARY

The present invention has an object to enable a user to easily recognize whether a saturation region is present in a radiographed radiation image.

To achieve the above object, according to an aspect of the present invention, a radiographic failure determination support device includes a determiner that makes a determination about whether a signal saturation region is present in a radiation image captured by radiographing a subject, and a notifier that, in a case in which the determiner determines that the signal saturation region is present in the radiation image, notifies a user that the signal saturation region is present in the radiation image.

According to another aspect of the present invention, a non-transitory computer-readable recording medium stores a program that causes a computer to function as a determiner that determines whether a signal saturation region is present in a radiation image captured by radiographing a subject, and a notifier that, in a case in which the determiner determines that the signal saturation region is present in the radiation image, notifies a user that the signal saturation region is present in the radiation image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6B is a diagram showing an example of an alert of which a user is notified on the examination screen in step S504 of FIG. 5 in a case in which the area of the saturation region is medium.

FIG. 6C is a diagram showing an example of an alert of which a user is notified on the examination screen in step S504 of FIG. 5 in a case in which the area of the saturation region is large.

DETAILED DESCRIPTION OF THE EMBODIMENTS

First Embodiment

Hereinafter, one or more embodiments of the present invention will be described with reference to the drawings. However, the scope of the invention is not limited to the disclosed embodiments.

Configuration of Medical Image System 100

Figure 1:
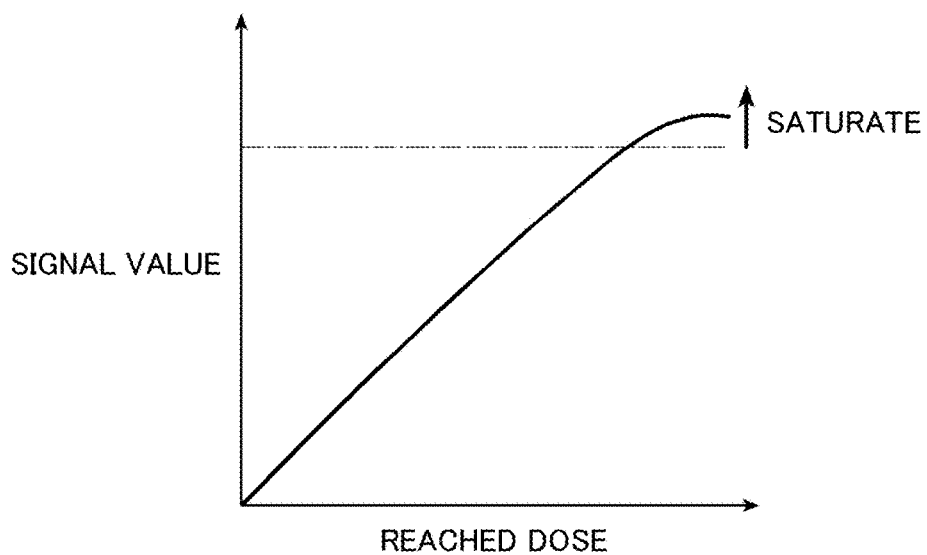
FIG. 1 is a graph for describing a saturation region.
Figure 2:
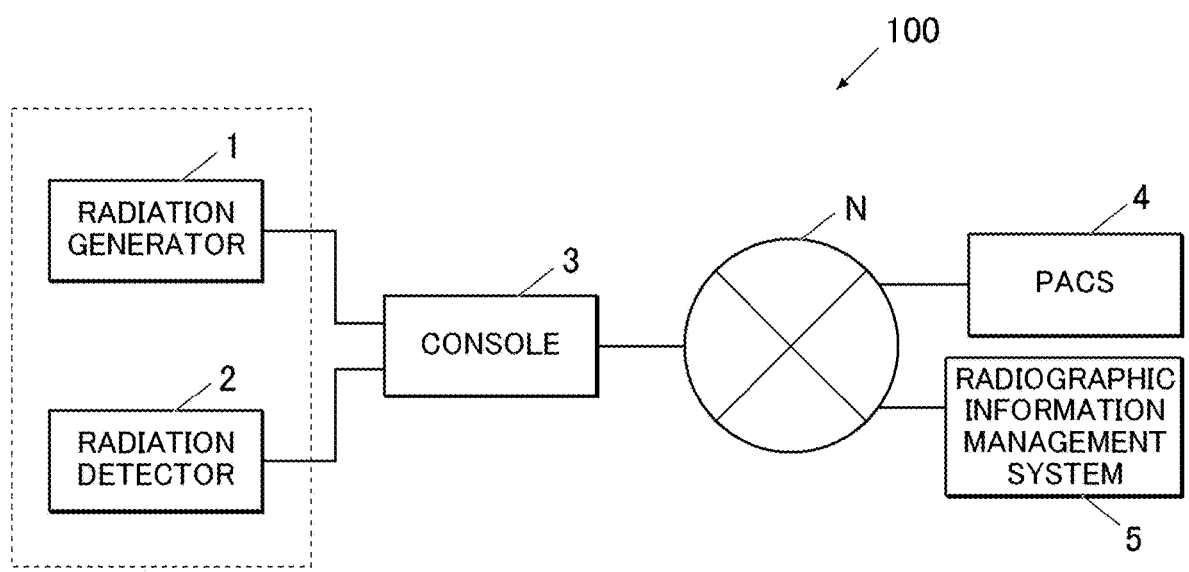
FIG. 2 is a diagram showing an overall configuration example of a medical image system.

A schematic configuration of a medical image system 100 according to a first embodiment will be described first. FIG. 2 is a block diagram showing the medical image system 100.

The medical image system 100 of the present embodiment includes a radiation generator 1, a radiation detector 2, a console 3, a PACS (Picture Archiving and Communication System) 4, and a radiographic information management system 5 as shown in FIG. 2. The console 3 is connected to the radiation generator 1 and the radiation detector 2 so as to communicate with each other. The console 3 is also capable of communicating with the PACS 4 and the radiographic information management system 5 via a communication network N installed in a hospital. The console 3 may be capable of communicating with a hospital information system (HIS), a radiology information system (RIS), or the like, neither shown, via the communication network N.

Although illustration is omitted, the radiation generator 1 includes a generator that, based on an operation performed on an irradiation instructing switch, applies a voltage in accordance with radiation irradiation conditions previously set, a radiation source that, when the voltage is applied from the generator, generates radiation (for example, X rays) of a dose in accordance with the applied voltage, and the like. The radiation generator 1 produces radiation in a manner appropriate for a radiation image to be radiographed.

The radiation generator 1 may be installed in a radiography room, or may be configured as a medical vehicle that is movable with the console 3 and the like.

Although illustration is omitted, the radiation detector 2 includes components such as a substrate on which pixels, each including a radiation detecting element that receives radiation to produce electric charge in accordance with a dose and a switching element that accumulates and discharges electric charge, are arrayed two-dimensionally (as a matrix), a scanning circuit that switches between on and off of each switching element, a readout circuit that reads out the amount of electric charge discharged from each pixel as a signal value, a controller that generates a radiation image from a plurality of signal values read out by the readout circuit, and an output unit that outputs data about the generated radiation image and the like to the outside.

The radiation detector 2 generates a radiation image in accordance with irradiated radiation in synchronization with timing when radiation is irradiated from the radiation generator 1, and transmits the radiation image to the console 3.

The radiation source of the radiation generator 1 and the radiation detector 2 are spaced and placed opposite to each other, and a subject between them is irradiated with radiation from the radiation source. The subject is thereby radiographed to acquire a radiation image. Radiography may be still radiography, or may be dynamic radiography for radiographing a motion of the subject.

The radiation detector 2 may be of what is called an indirect type that includes a scintillator and the like and converts irradiated radiation into light of another wavelength, such as visible light, by the scintillator to produce electric charge in accordance with the converted light, or may be of what is called a direct type that produces electric charge directly from radiation without the interposition of a scintillator or the like.

In addition, the radiation detector 2 may be of a dedicated machine type integrated with a radiographic stand, or may be of a portable type (cassette type).

The console 3 is implemented by a PC, a dedicated device, or the like.

The console 3 is a radiography control device that controls radiography. The console 3 has functions as a radiographic failure determination support device, and has a function of determining whether a saturation region is present in a radiation image transmitted from the radiation detector 2, and in a case in which the console 3 determines that the saturation region is present, notifying a user of the fact.

The details of the console 3 will be described later.

The PACS 4 is implemented by a PC or a dedicated device, an imaginary server on a cloud, and a client terminal for radiologic interpretations. The server of the PACS 4 stores and manages medical images including radiographed radiation images in association with patient information (such as patient ID, patient name, age, and sex) and examination information (such as examination ID, examination date, part, and radiographing direction), and displays a medical image required by the client terminal.

The radiographic information management system 5 stores a radiation image determined as a radiographic failure. Specifically, the radiographic information management system 5 has a storage such as a hard disk, and stores, in the storage, a radiation image determined as a radiographic failure in association with information indicating the position of a saturation region (such as, for example, coordinate information) and radiographic conditions (such as dose information (such as, for example, tube voltage, tube current, and irradiation time), part, radiographing direction, and radiologist (radiographer) in charge). The radiographic information management system 5 displays the stored radiation image together with the information indicating the position of a saturation region and radiographic conditions, and analyzes a part in which a saturation region is likely to occur and a reference irradiation dose for each part and each radiographing direction.

Configuration of Console 3

Figure 3:
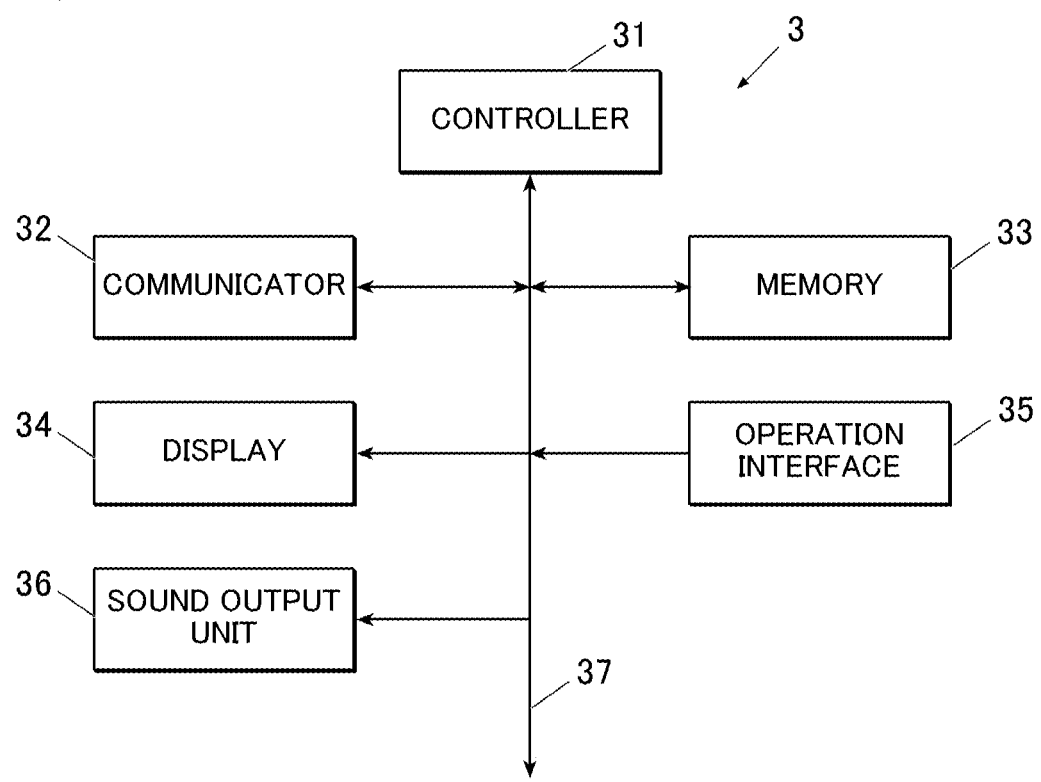
FIG. 3 is a block diagram showing a functional configuration of a console of FIG. 2.

A specific configuration of the console 3 will now be described. FIG. 3 is a block diagram showing the console 3.

The console 3 according to the present embodiment includes a controller 31, a communicator 32, a memory 33, a display 34, an operation interface 35, and a sound output unit 36 as shown in FIG. 3. The respective components are connected to each other with a bus 37.

Rather than providing the display 34 and the operation interface 35 for the console 3, a display device (such as a tablet terminal) including a display and an operation interface may be connected to the console 3.

The controller 31 includes a central processing unit (CPU), a random access memory (RAM), and the like.

The CPU of the controller 31 reads out various programs stored in the memory 33, expands them into the RAM, and executes various types of processing in accordance with the expanded programs to provide centralized control over operations of the respective components of the console 3. For example, upon receipt of examination order information from the RIS or the like not shown by the communicator 32, the controller 31 causes the received examination order information to be stored in the memory 33 and to be displayed on an examination list screen (not shown) of the display 34. The examination order information includes an examination ID, an examination date, patient information, and information (such as a part and a radiographing direction) concerning radiography included in an examination. When examination order information about an examination to be performed is selected on the examination list screen, the controller 31 executes a radiography control process A or the like which will be described later. The controller 31 cooperates with a program stored in the memory 33 to execute the radiography control process A which will be described later, thereby functioning as a determiner, a deriver, and a storage controller of the present invention.

The communicator 32 is implemented by a communication module and the like.

The communicator 32 transmits/receives various signals and various types of data to/from another device or system (such as the PACS 4 or the radiographic information management system 5) connected via the radiation generator 1, the radiation detector 2, and the communication network N (such as a local area network (LAN), a wide area network (WAN), or the Internet).

The memory 33 is implemented by a nonvolatile semiconductor memory, a hard disk, or the like.

The memory 33 stores various programs to be executed by the controller 31, parameters necessary for execution of the programs, and the like.

The memory 33 also stores examination order information transmitted from the RIS or the like.

The memory 33 may store a radiation image.

The display 34 is implemented by a liquid crystal display (LCD), a cathode ray tube (CRT), or the like.

The display 34 displays the examination list screen, an examination screen 341 (see FIG. 6A to FIG. 6C, for example), notification information, and the like based on a control signal input from the controller 31. The display 34 cooperates with the controller 31 to function as a notifier.

The operation interface 35 is configured to be operated by a user with a keyboard including cursor keys, numeric keys, various function keys, and the like, a pointing device such as a mouse, a touch panel laminated on the surface of the display device, and the like. The operation interface 35 outputs a control signal in accordance with an operation performed by the user to the controller 31.

The sound output unit 36 includes a speaker or the like, and outputs a sound (voice) under the control of the controller 31. The sound output unit 36 cooperates with the controller 31 to function as the notifier.

Operation

An operation of the medical image system 100 will now be described.

Figure 4:
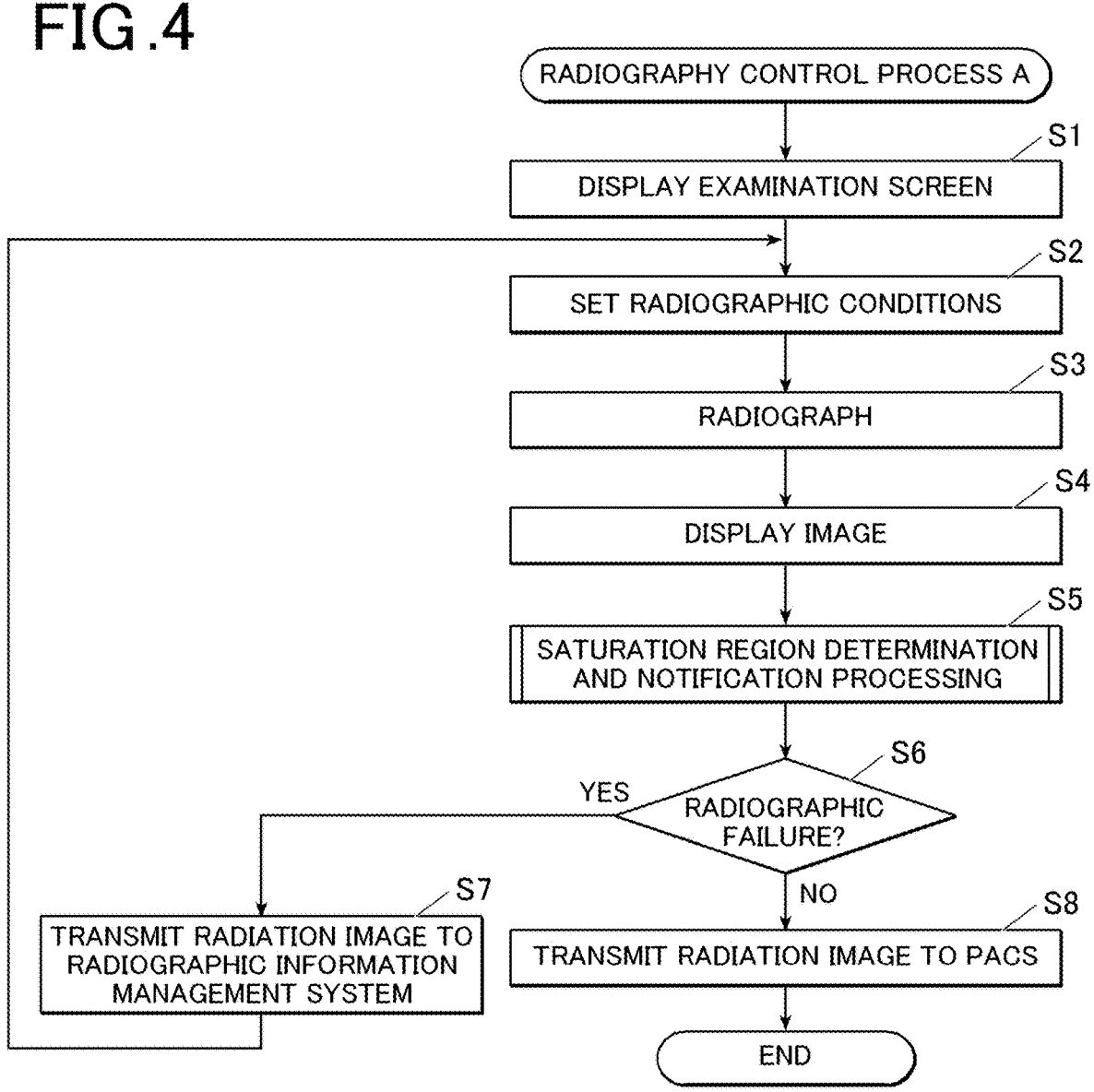
FIG. 4 is a flowchart showing a radiography control process A executed by a controller of FIG. 3 in a first embodiment.

FIG. 4 is a flowchart showing a flow of the radiography control process A executed in the console 3. When examination order information is selected through the operation interface 35 on the examination list screen displayed on the display 34, the controller 31 of the console 3 and a program stored in the memory 33 cooperate to execute the radiography control process A shown in FIG. 4.

The controller 31 first causes the display 34 to display the examination screen 341 for the selected examination order information (step S1).

The examination screen 341 (see FIG. 6A to FIG. 6C, for example) is provided with radiography selection buttons 341a where contents of each radiography session included in the examination order information are displayed, a setting region 341b for setting image reading conditions and image processing conditions for selected radiography, an image display region 341c for providing a preview display of a radiographed radiation image, a radiographic failure button 341d, an output button 341e, and the like. At the stage of step S1, any radiation image has not been displayed in the image display region 341c.

The controller 31 then sets radiographic conditions (image reading conditions) for radiography to be performed in the radiation detector 2 in accordance with an operation on the examination screen 341. Examples of the image reading conditions include a pixel size, an image size, and the like. The radiographic conditions (radiation irradiation conditions) set by the user through an operation panel of the radiation generator 1 are acquired from the radiation generator 1 (step S2). Examples of the radiation irradiation conditions include a tube voltage (kV), a tube current (mA), an irradiation time (ms), and SID (cm) of the radiation source.

The controller 31 then controls the radiation generator 1 and the radiation detector 2 in accordance with an operation of the irradiation instructing switch of the operation interface 35, thereby performing radiography (step S3).

A radiation image acquired in the radiation detector 2 through radiography is transmitted to the console 3.

Upon receipt of the radiation image from the radiation detector 2, the controller 31 causes the display 34 to display the radiation image (step S4).

The controller 31 causes the received radiation image to be displayed in the image display region 341c of the examination screen 341.

The controller 31 then performs saturation region determination and notification processing on the received radiation image (step S5).

Figure 5:
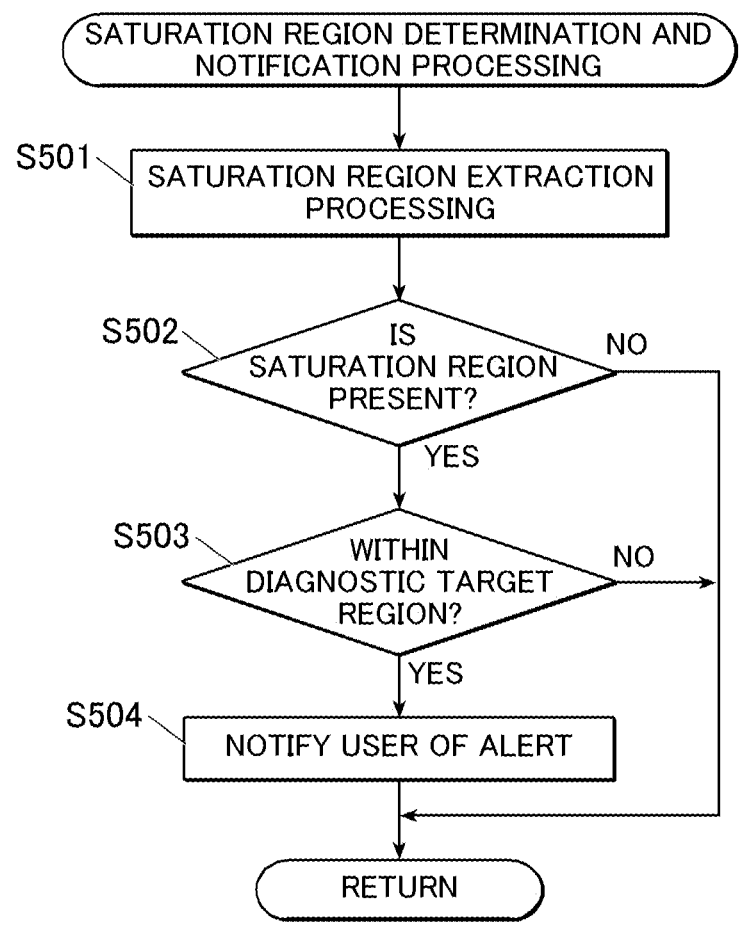
FIG. 5 is a flowchart showing saturation region determination and notification processing executed in step S5 of FIG. 4.

FIG. 5 is a flowchart showing a flow of the saturation region determination and notification processing executed in step S5. The controller 31 and a program stored in the memory 33 cooperate to execute the saturation region determination and notification processing.

In the saturation region determination and notification processing, the controller 31 first performs saturation region extraction processing (step S501).

In the saturation region extraction processing, for example, a pixel region in which a larger number of pixels than predetermined pixels (for example, more than or equal to 2×2 pixels), each having a signal value higher than or equal to a threshold value TH determined previously, connect to each other in the radiation image is extracted as a saturation region. The above threshold value TH is a value obtained experimentally or empirically.

Regions each having a signal value higher than or equal to the threshold value TH determined previously may all be determined as saturation regions. However, in a case in which the area (the number of pixels) of a saturation region is small (the area (the number of pixels) is less than a predetermined threshold value: for example, less than 2×2 pixels), the region is likely to be noise such as a defective pixel. Such a region is thus eliminated from saturation regions in the present embodiment in order to improve extraction accuracy.

The controller 31 may acquire positional information about a defective pixel from the radiation detector 2, and referring to the acquired positional information about the defective pixel, may eliminate the position corresponding to the defective pixel from the determination about a saturation region. This is because an abnormality of the radiation detector 2 may cause a defective pixel not to take a correct signal value. Positional information about a defective pixel of the radiation detector 2 may be previously stored in the memory 33, and the controller 31 may acquire the positional information about the defective pixel from the memory 33.

The controller 31 then determines whether a saturation region is present in the received radiation image based on a processing result of the saturation region extraction processing (step S502).

In a case in which the controller 31 determines that a saturation region is not present in the received radiation image (NO in step S502), the controller 31 proceeds into step S6 of FIG. 4.

In a case in which the controller 31 determines that a saturation region is present in the received radiation image (YES in step S502), the controller 31 determines whether the saturation region is present within a diagnostic target region of the radiation image (step S503).

In step S503, the controller 31 may change an algorithm to be applied when determining whether the saturation region is present within the diagnostic target region based on part information about a subject in the radiation image. The part information about the subject in the radiation image may be acquired based on the examination order information, or may be acquired from the radiation image through image recognition processing.

For example, in a case in which the part of the subject is the chest or abdomen, or in a case of long radiography of parts including the chest, an algorithm is applied which extracts the lung field region and skin line from the radiation image, recognizes, as a diagnostic target region, a region separated by the skin line from a directly exposed region (where radiation has reached without passing through the subject), and in a case in which a saturation region is present within the lung field region or on the skin line, determines that the saturation region is present within the diagnostic target region. In a case of any other part, an algorithm is applied which extracts the skin line from the radiation image, recognizes, as a diagnostic target region, a region separated by the skin line from a directly exposed region, and in a case in which the saturation region is present on the skin line, determines that the saturation region is present within the diagnostic target region.

In a case in which the controller 31 determines that the saturation region is not present within the diagnostic target region of the radiation image (NO in step S503), the controller 31 proceeds into step S6 of FIG. 4.

In a case in which the controller 31 determines that the saturation region is present within the diagnostic target region of the radiation image (YES in step S503), the controller 31 notifies the user of an alert indicating that the saturation region is present in the radiation image (step S504), and proceeds into step S6 of FIG. 4.

A saturation region within the diagnostic target region is highly likely to affect diagnosis, which is highly likely to result in a radiographic failure. Therefore, in step S504, the user is notified of an alert indicating that a saturation region is present (that is, a radiographic failure is likely to have occurred).

A method of notifying the user of the alert is not particularly limited. For example, a predetermined icon (for example, 341*f* in FIG. 6A) showing that a saturation region is present in the radiation image may be displayed on the display 34, or an alert sound may be output from the sound output unit 36, or a check button (for example, 341*g* in FIG. 6C) that prompts the user to make a check may be displayed on the display 34. By being notified of the alert indicating that a saturation region is present in the radiation image, the user easily recognizes that the saturation region is included in the diagnostic target region of the radiographed radiation image (that is, a radiographic failure is likely to have occurred), and the user is prompted to check whether a radiographic failure has occurred (whether re-radiography is necessary).

Figure 6A:
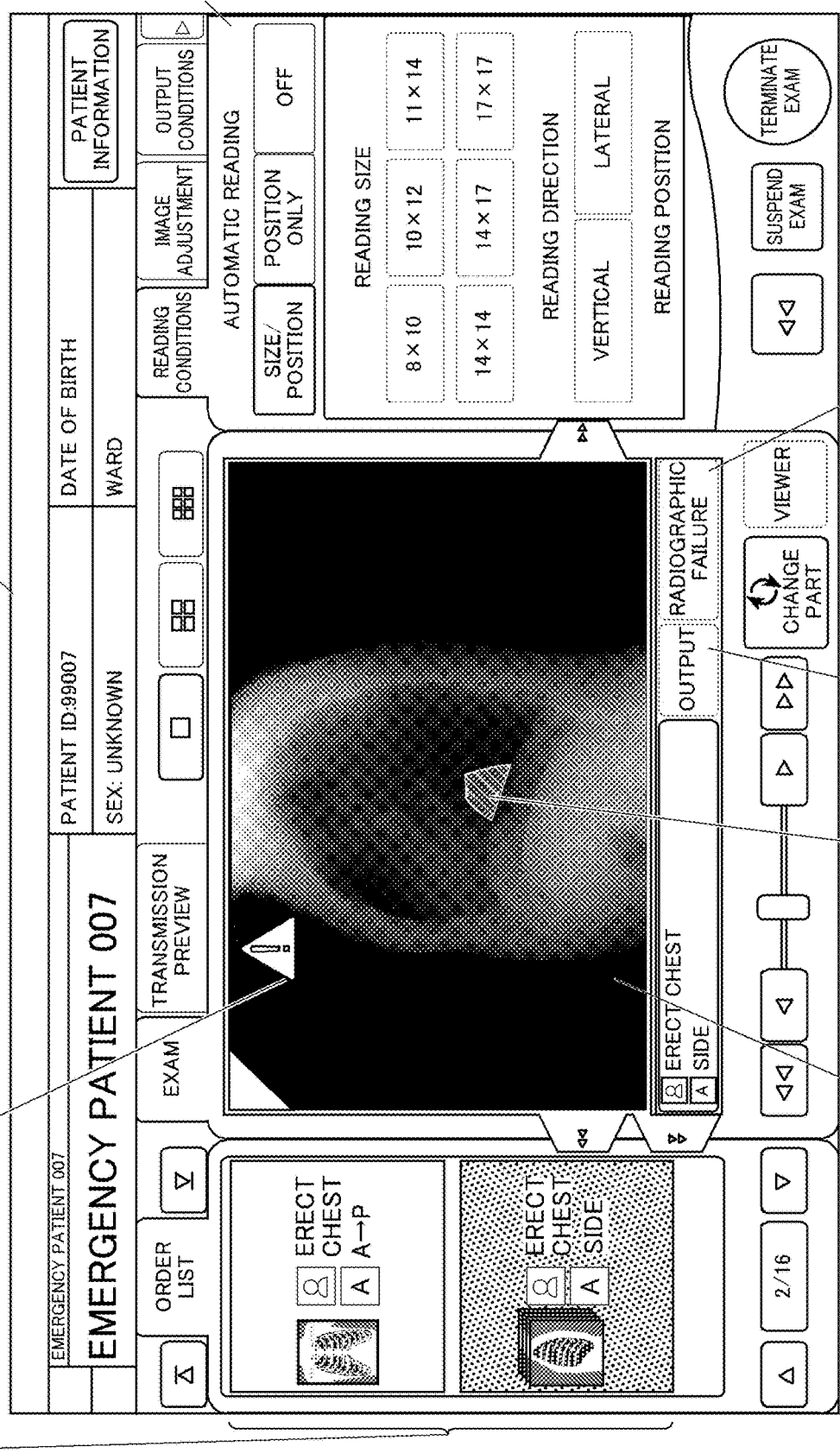
FIG. 6A is a diagram showing an example of an alert of which a user is notified on an examination screen in step S504 of FIG. 5 in a case in which the area of the saturation region is small.
Figure 6B:
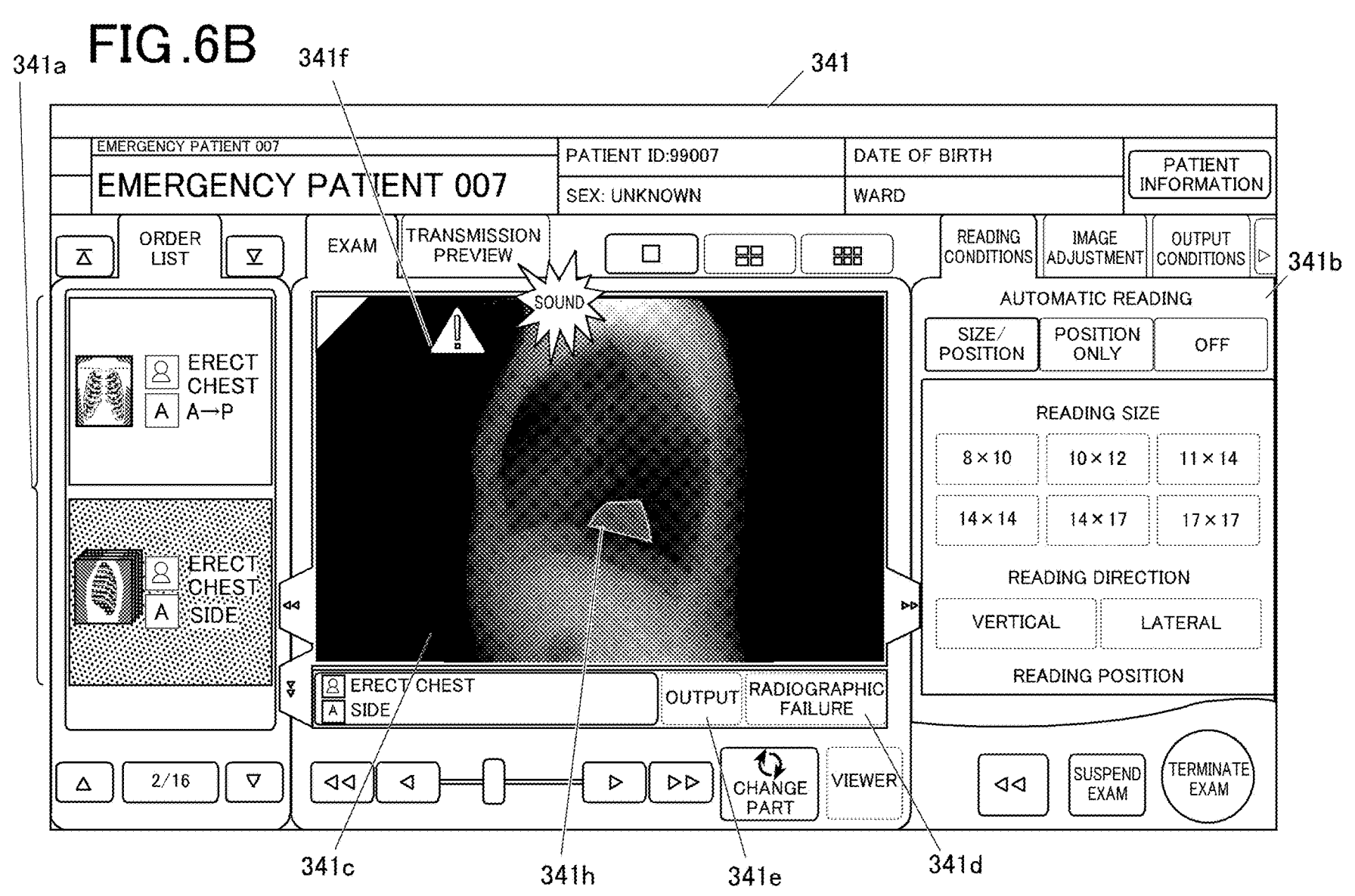

The controller 31 may change the notifying method in accordance with the area of the saturation region. For example, in a case in which the area of the saturation region is smaller than or equal to a first threshold value, the controller 31 determines that the degree of abnormality is low, and only an icon 341*f* is displayed as shown in FIG. 6A. In a case in which the area of the saturation region is larger than the first threshold value and smaller than or equal to a second threshold value, the controller 31 determines that the degree of abnormality is medium, and an alert sound is output in addition to display of the icon 341*f* as shown in FIG. 6B. In a case in which the area of the saturation region exceeds the second threshold value, the controller 31 determines that the degree of abnormality is high, and the check button 341*g* is further displayed in addition to the icon 341*f* and the alert sound as shown in FIG. 6C (the first threshold value<the second threshold value).

It is preferable for the controller 31 to notify the user of the position of the saturation region (saturation region within the diagnostic target region) as shown in FIG. 6A to FIG. 6C together with the above alert. As indicated by a reference character 341*h* in FIG. 6A to FIG. 6C, for example, display is provided in a manner that is recognizable by the user by coloring the saturation region in the radiation image (saturation region within the diagnostic target region) displayed in the image display region 341*c*, coloring the contour of the saturation region, or the like. This enables the user to check which signal value within the radiation image has saturated. The controller 31 may display the saturation region in an enlarged manner in response to a user's operation. For example, when the user clicks the saturation region through the operation interface 35, the controller 31 displays the clicked saturation region in an enlarged manner. This enables the user to easily check the saturation region.

Figure 7A:
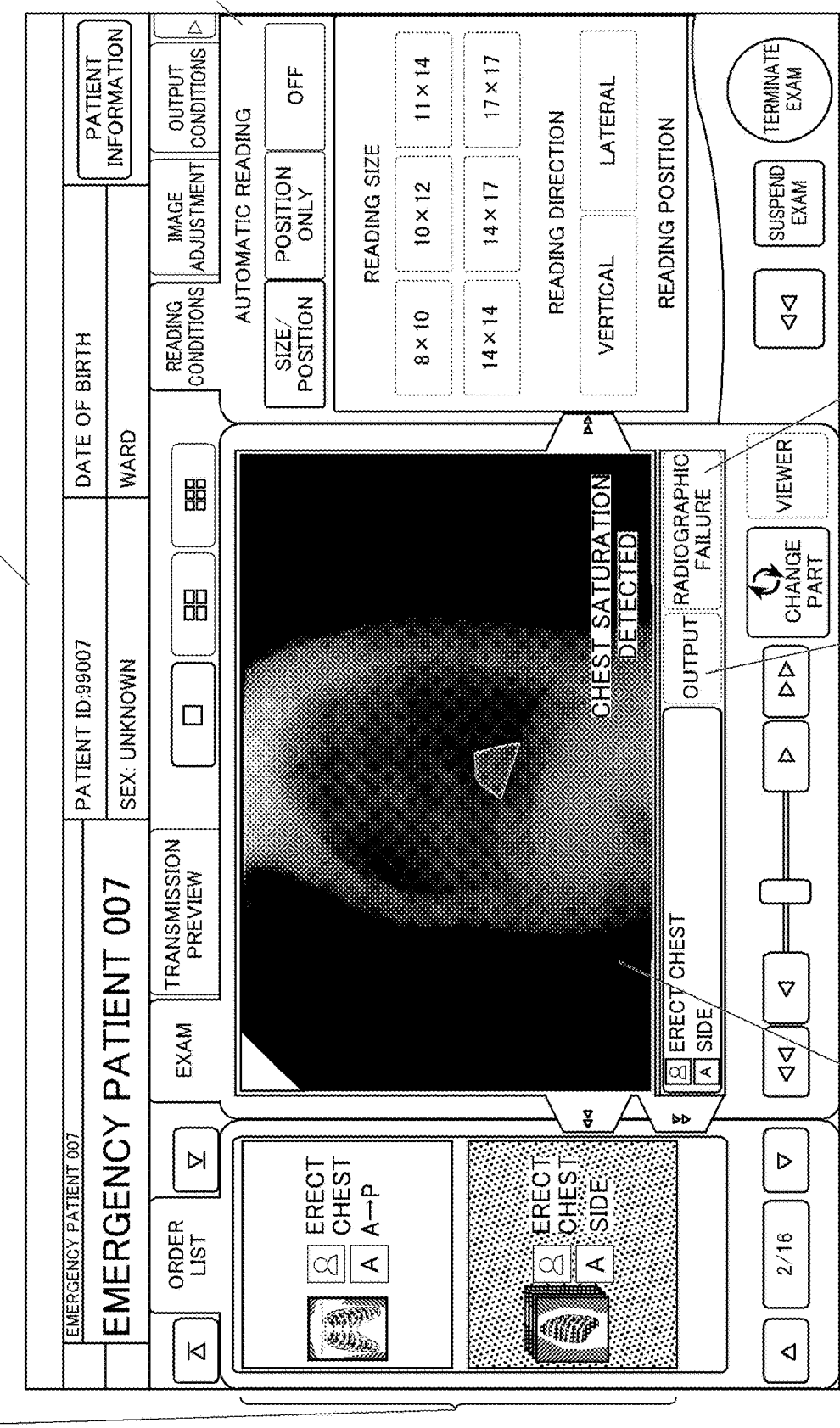
FIG. 7A is a diagram showing a notification example of an algorithm applied when recognizing a diagnostic target region.
Figure 7B:
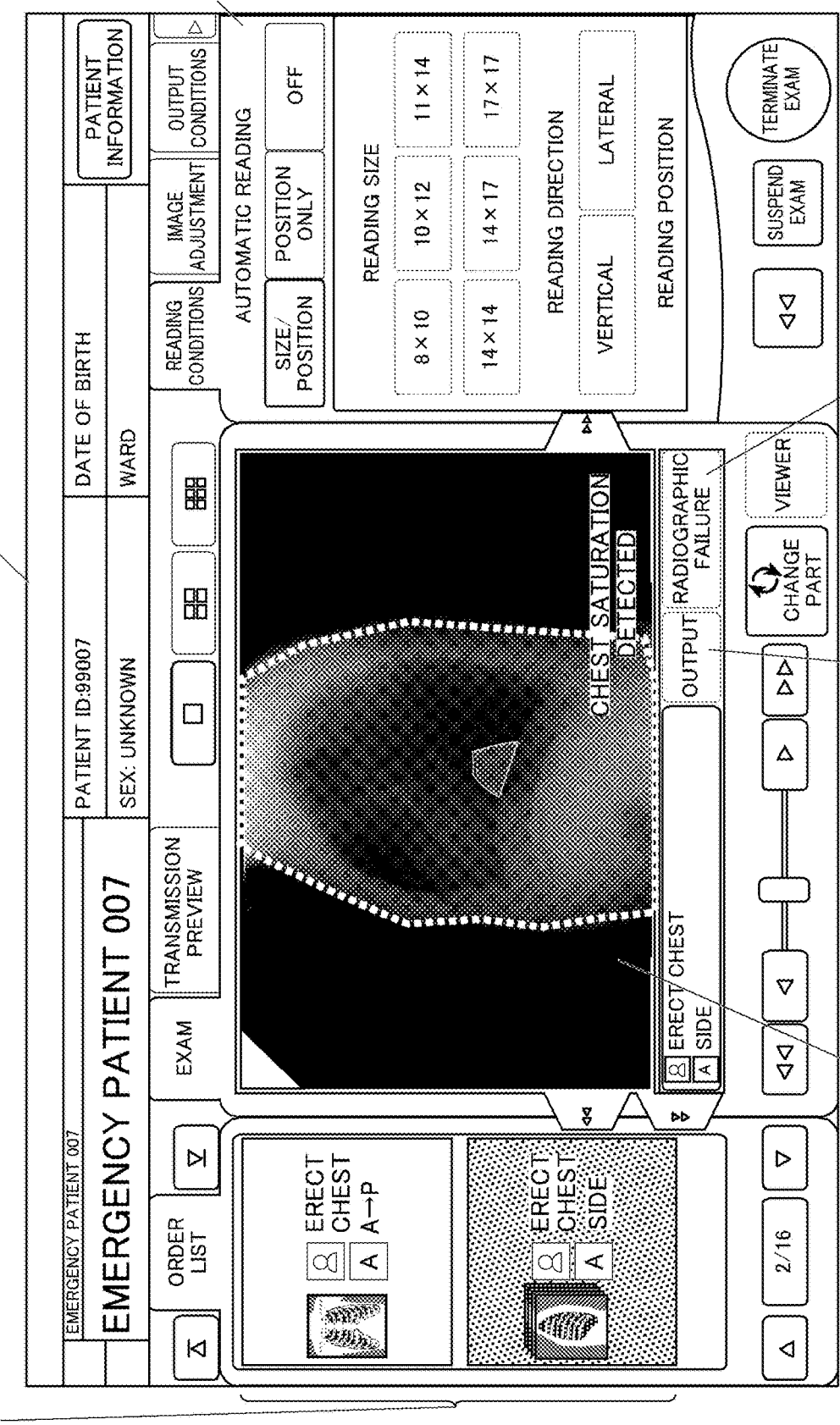
FIG. 7B is a diagram showing a notification example of an algorithm applied when recognizing a diagnostic target region.

In step S504, the user may be notified of the algorithm applied for determining whether the saturation region is present within the diagnostic target region in step S503 together with the alert so as to be recognized by the user. For example, the name of the applied algorithm ("chest saturation detected" in FIG. 7A) may be displayed on the display 34 as shown in FIG. 7A, a region recognized as a diagnostic target region by the applied algorithm may be displayed in a recognizable manner as shown in FIG. 7B, or the both may be displayed. This enables the user to check whether recognition of the diagnostic target region made by the console 3 is incorrect. The applied algorithm may be displayed in step S503.

The controller 31 may analyze the radiation image to derive an improved value of the radiographic conditions when performing re-radiography, and may display the improved value of the radiographic conditions on the display 34. The radiographic conditions when the radiation image is radiographed may be displayed together.

Figure 8:
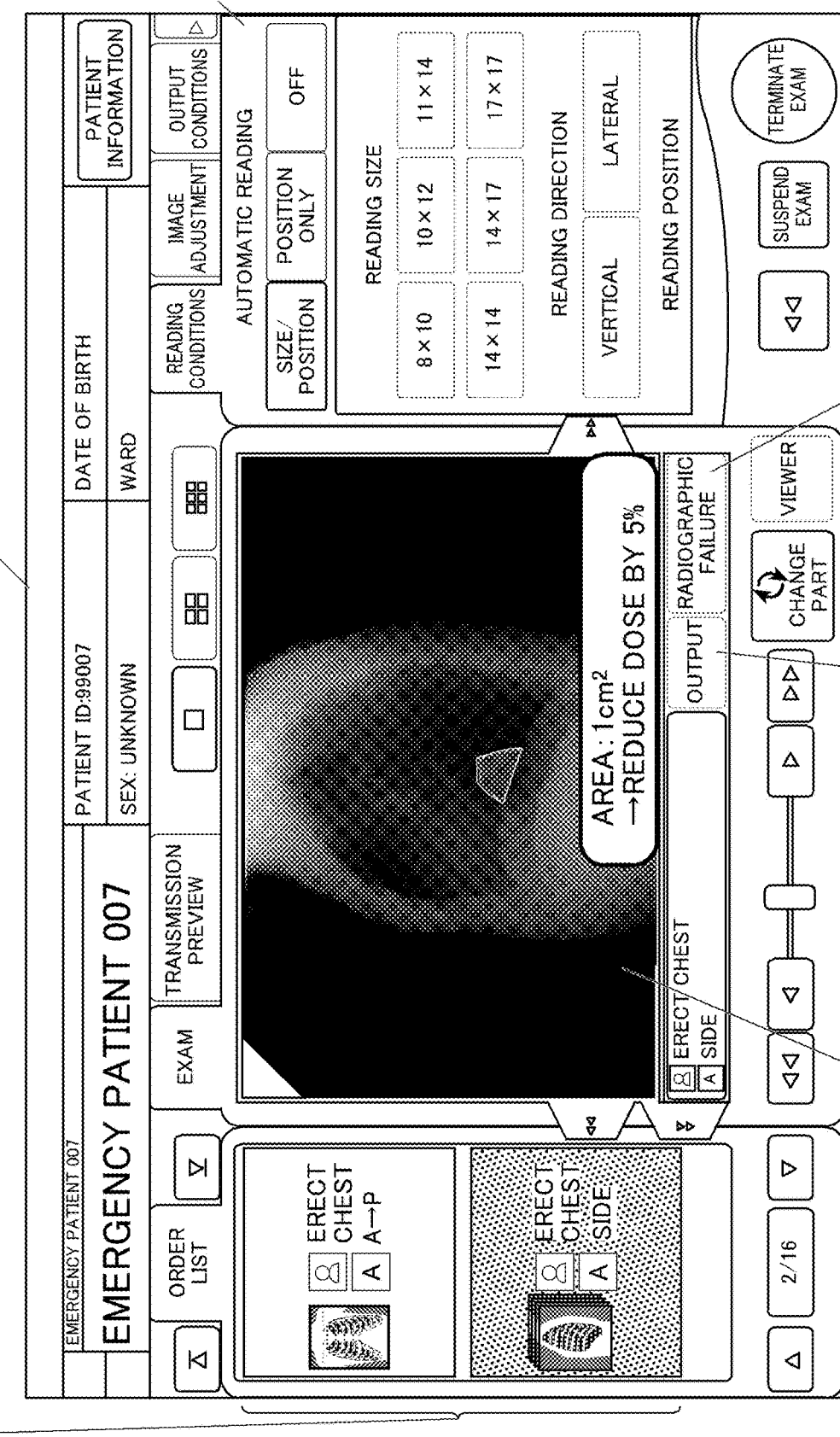
FIG. 8 is a diagram showing a display example of a reduction reference of dose.

For example, a reduction reference of irradiation dose (by what percent the irradiation dose is to be reduced so as not to cause a saturation region), for example, may be derived as an improved value of the radiographic conditions based on the number of pixels (area) of the saturation region in the radiation image, or an area ratio of the saturation region in the radiation image or in the diagnostic target region. The reduction reference of irradiation dose may be displayed together with an alert as shown in FIG. 8. It is considered that as the area of the saturation region is larger, a higher dose is irradiated at radiography. Thus, as the number of pixels of the saturation region, or the area ratio of the saturation region in the radiation image or in the diagnostic target region is larger, the reduction reference of irradiation dose at re-radiography is larger.

Figure 9:
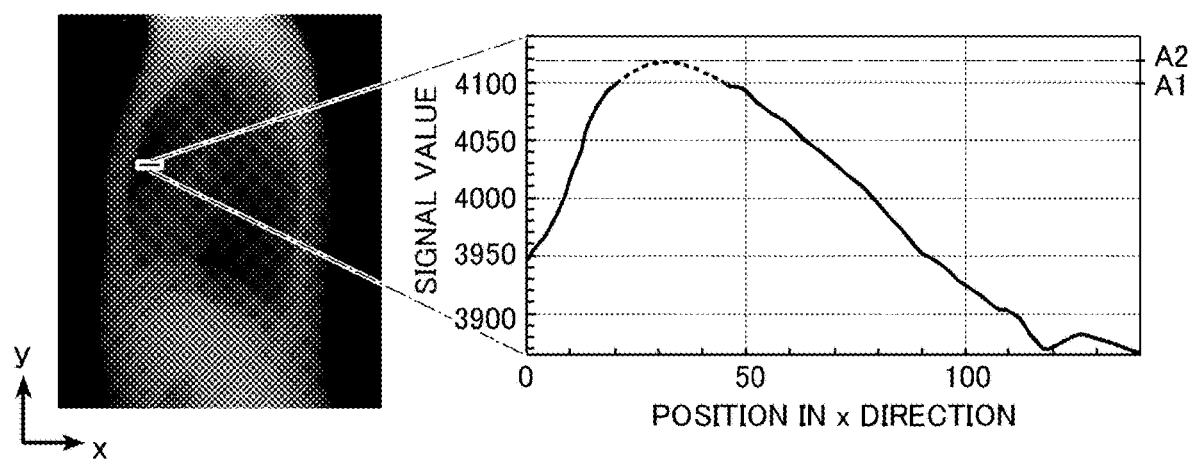
FIG. 9 is a diagram for describing a technique for calculating the reduction reference of dose.

As shown in FIG. 9, for example, profile information in the radiation image may be generated, and based on profile information around the saturation region, a maximum signal value corresponding to a maximum irradiated dose may be predicted (as a predicted maximum signal value), and based on the predicted maximum signal value, the reduction reference of irradiation dose at re-radiography may be derived as an improved value of the radiographic conditions and displayed together with an alert. The reduction reference is derived by Expression 1 below, where A1 indicates the upper limit of an unsaturated signal value, and A2 indicates the predicted maximum signal value of the saturation region (see FIG. 9), for example.

$$\text{Reduction reference} = (A2 - A1) \div A1 \quad \text{Expression 1}$$

Display of the reduction reference of irradiation dose at re-radiography enables the user to set an appropriate dose for radiography when performing re-radiography.

The user checks the radiation image and notification information displayed on the examination screen 341, and determines whether a radiographic failure that affects diagnosis has occurred. In a case in which the user determines that a radiographic failure that affects diagnosis has occurred, the user presses the radiographic failure button 341d through the operation interface 35. In a case in which the user determines that a radiographic failure that affects diagnosis has not occurred, the user presses the output button 341e through the operation interface 35.

In step S6 of FIG. 4, the controller 31 determines whether the radiographic failure button 341d has been pressed through the operation interface 35 (step S6).

In a case in which the controller 31 determines that the radiographic failure button 341d has been pressed through the operation interface 35 (YES in step S6), the controller 31 associates a radiation image in which a radiographic failure has occurred, positional information about the saturation region, and radiographic conditions (such as dose information (tube voltage (kV), tube current (mA), irradiation time (ms), SID (cm)), part information, and information about a radiologist in charge), and transmits them to the radiographic information management system 5 by the communicator 32 to be stored in the storage (step S7).

Accumulation and storage of the radiation image in which the radiographic failure has occurred, positional information about the saturation region, and radiographic conditions in the radiographic information management system 5 in association with each other enables radiographic conditions that would cause a saturation region to be displayed, and enables a part in which a saturation region is likely to occur, a reference for irradiation dose that does not cause a saturation region, and the like to be analyzed. This is helpful for educating radiographers later.

The user presses the radiographic failure button 341d in some cases for reasons other than an occurrence of a saturation region, such as a protrusion of the diagnostic target region from the radiation image, for example. In a case in which a saturation region has not occurred, transmission of positional information about a saturation region is omitted.

The controller 31 then returns to step S2 to perform steps S2 to S6 repeatedly.

In step S6, in a case in which the controller 31 determines that the radiographic failure button 341d has not been pressed through the operation interface 35, but the output button 341e has been pressed (NO in step S6), the controller 31 transmits the received radiation image to the PACS 4 by the communicator 32 in association with the patient information and examination information (such as examination ID, examination date, part, and radiographing direction) (step S8), and terminates the radiography control process A.

In this manner, in the present embodiment, in a case in which a saturation region is present in a diagnostic target region of a radiation image, the user is notified of an alert indicating the fact. This enables the user to easily recognize whether the saturation region is present within the diagnostic target region of the radiographed radiation image. As a result, the user recognizes whether radiography has been performed at an appropriate dose, which leads to improvement of radiographic conditions for subsequent radiography sessions. Further, a radiation image not suitable for diagnosis because of an occurrence of a saturation region is prevented from being provided for diagnosis.

The present embodiment has been described using the case of, in a case in which a saturation region is present in the diagnostic target region, notifying the user of an alert indicating the fact as an example, but in a case in which a saturation region is present on the radiation image rather than in the diagnostic target region, the controller 31 may notify the user of an alert indicating the fact. In a case in which the saturation region is present outside the diagnostic target region (for example, in a directly exposed region), diagnosis is not affected. However, by enabling the user to easily recognize whether a saturation region is present, the user is able to improve radiographic conditions for subsequent radiography sessions in a case in which a saturation region is present. This prevents a patient from being continuously overexposed.

In the above embodiment, the processing of extracting the saturation region from the radiation image is performed first, and whether the extracted saturation region is present within the diagnostic target region is determined, whereas the diagnostic target region may be extracted first from the radiation image, and the saturation region may be extracted from the extracted diagnostic target region to determine whether the saturation region is present within the diagnostic target region.

Second Embodiment

A second embodiment of the present invention will now be described.

In the second embodiment, an example of controlling whether the saturation region determination and notification processing is to be performed will be described.

The medical image system 100 in the second embodiment has a configuration similar to that described in the first embodiment, and thus the description is employed. Hereinafter, an operation of the second embodiment will be described.

Figure 10:
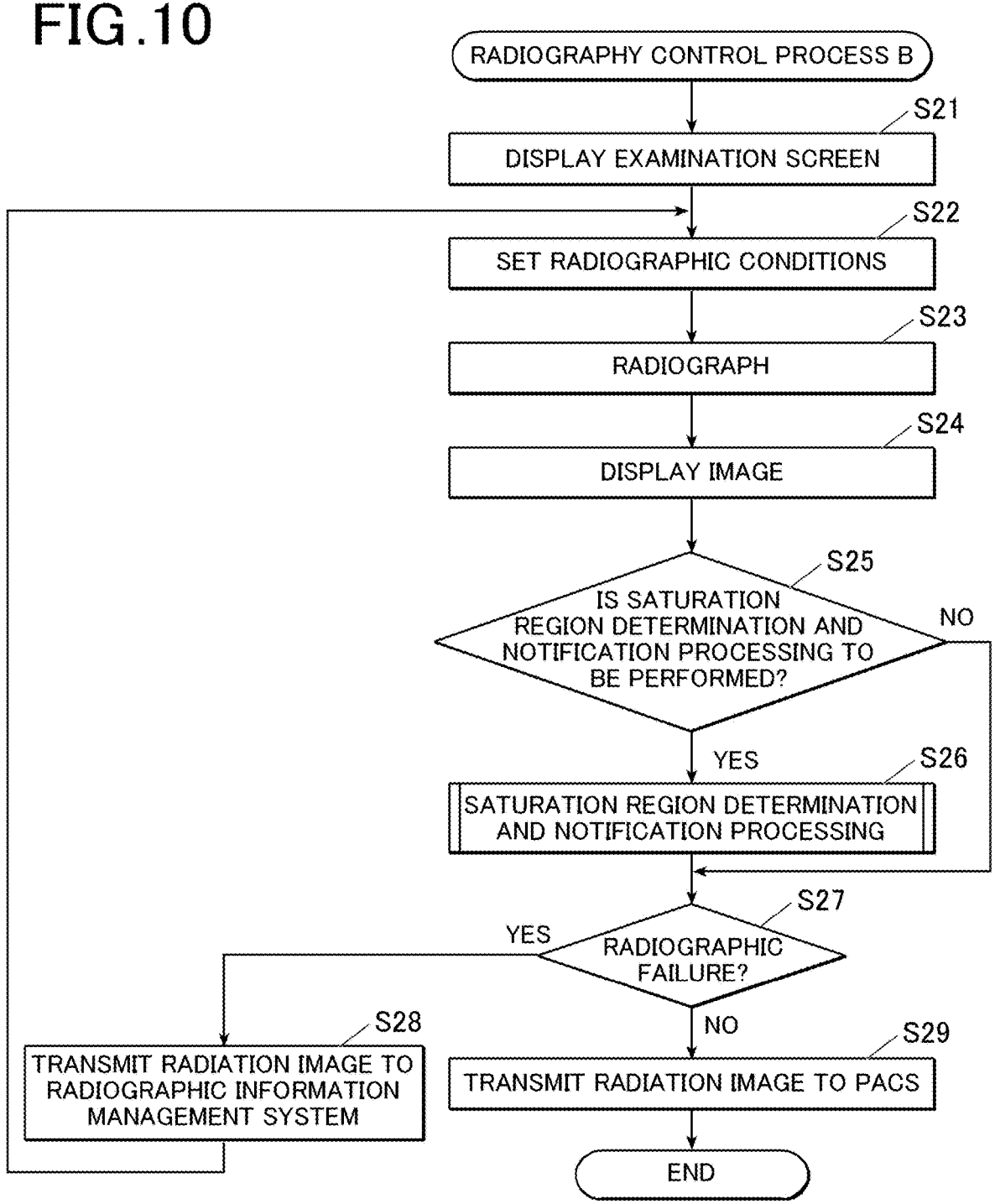
FIG. 10 is a flowchart showing a radiography control process B executed by the controller of FIG. 3 in a second embodiment.

FIG. 10 is a flowchart showing a flow of a radiography control process B executed by the console 3 in the second embodiment. When examination order information is selected through the operation interface 35 on the examination list screen displayed on the display 34, the controller 31 of the console 3 and a program stored in the memory 33 cooperate to execute the radiography control process B shown in FIG. 10. The controller 31 functions as the determiner, the deriver, the determination controller, and the storage controller of the present invention by executing the radiography control process B.

The controller 31 first causes the display 34 to display the examination screen 341 about selected examination order information (step S21).

The controller 31 then sets radiographic conditions (image reading conditions) for radiography to be performed in the radiation detector 2 in response to operations on the examination screen 341. The radiographic conditions (radiation irradiation conditions) set by the user through the operation panel of the radiation generator 1 are acquired from the radiation generator 1 (step S22).

The controller 31 then controls the radiation generator 1 and the radiation detector 2 in response to an operation of the irradiation instructing switch of the operation interface 35, thereby performing radiography (step S23).

Upon receipt of a radiation image from the radiation detector 2, the controller 31 causes the display 34 to display the radiation image (step S24).

The processing of steps S21 to S24 is similar to that of steps S1 to S4 of FIG. 4, and thus the description is employed.

The controller 31 then determines whether the saturation region determination and notification processing (see FIG. 5) is to be performed (step S25).

In step S25, for example, the controller 31 acquires part information about a subject, and based on the acquired part information, determines whether the saturation region determination and notification processing is to be performed. For example, in a case in which a part which is the subject is a body trunk part such as the chest, abdomen, or lumbar, the subject is thick. Thus, the subject is irradiated with a high dose of radiation so as to pass through the thick subject. A saturation region is likely to be produced in a radiation image accordingly. In a case of another part, the subject is not too thick to be irradiated with a very high dose of radiation, so that a saturation region is less likely to be produced in a radiation image. Therefore, the controller 31 performs part recognition on the received radiation image to acquire part information about the subject, or acquires part information about the subject from examination order information, for example, and in a case in which the subject part is a body trunk part such as the chest, abdomen, or lumbar, determines that the saturation region determination and notification processing is to be performed. In a case of any other part, such as a hand, leg, or head, for example, the controller 31 determines that the saturation region determination and notification processing is not to be performed. A part for which a saturation region is less likely to be produced is therefore eliminated from the target of the saturation region determination and notification processing. This prevents the processing time from increasing.

Alternatively, the controller 31 may determine whether the saturation region determination and notification processing is to be performed based on the part information about the subject and the radiographing direction. Particularly in a case in which the radiographing direction is sideways in a body trunk part, the thickness of the subject is large. The subject is thus irradiated with a higher dose of radiation. The controller 31 therefore acquires the part information about the subject and information about the radiographing direction, and in a case in which the subject part is a body trunk part such as the chest, abdomen, or lumbar and in a case in which the radiographing direction is sideways, determines that the saturation region determination and notification processing is to be performed. In a case of any other part or radiographing direction, the controller 31 determines that the saturation region determination and notification processing is not to be performed. This further prevents the processing time from increasing. The radiographing direction may be acquired from the examination order information similarly to the part information, or may be acquired from the radiation image through image recognition.

Alternatively, the thickness of the subject may be estimated from the radiographic conditions (for example, tube voltage and radiographed part) or an image histogram of the radiation image, and in a case in which the thickness of the subject is more than or equal to a predetermined threshold value, the controller 31 may determine that the saturation region determination and notification processing is to be performed. In a case in which the thickness of the subject falls below the predetermined threshold value, the controller 31 may determine that the saturation region determination and notification processing is not to be performed. Thus, in a case in which the thickness of the subject is small (thin) and a saturation region is less likely to be produced, the radiation image is not targeted for the saturation region determination and notification processing. This prevents the processing time from increasing. The threshold value of the thickness of the subject may be set previously, or may be set by the user through the operation interface 35. As described in JP 2016-202219A, for example, a histogram obtained by voting pixel signal values (signal values) within two regions of interest determined previously for each radiographed part in a radiation image is generated, and a difference $\Delta Vc$ between two reference signal values (for example, representative signal values of the respective regions of interest) in the distribution of the histogram is calculated. The thickness of the subject is estimated from a relation (such as a relational expression or a table) between the thickness of the subject and $\Delta Vc$ per tube voltage, the relation being calculated experimentally in advance.

In a case in which a radiation image that is not related to diagnosis, such as a test chart, is radiographed, the controller 31 may determine that the saturation region determination and notification processing is not to be performed. This reduces a wasteful processing time.

The controller 31 may determine whether the saturation region determination and notification processing is to be performed based on information about the radiation detector 2 used for radiography and information concerning an irradiation dose at radiography. For example, in a case in which the irradiation dose at radiography is less than or equal to an upper limit dose of the radiation detector 2 (an upper limit of radiation dose at which the signal value does not saturate), a saturation region is not produced in the radiation image. Therefore, the controller 31 acquires the information about the radiation detector 2 used for radiographing the radiation image (information about the upper limit dose) from the radiation detector 2, and acquires the irradiation dose at radiography based on the radiographic conditions for the radiation image. In a case in which the irradiation dose at radiography exceeds the upper limit dose of the radiation detector 2, the controller 31 determines that the saturation region determination and notification processing is to be performed. In a case in which the irradiation dose at radiography is less than or equal to the upper limit dose of the radiation detector 2, the controller 31 determines that the saturation region determination and notification processing is not to be performed. Thus, in a case in which the irradiation dose is lower than the upper limit dose of the radiation detector 2, the radiation image is not targeted for the saturation region determination and notification processing. This prevents the processing time from increasing.

In step S25, in a case in which the controller 31 determines that the saturation region determination and notification processing is to be performed (YES in step S25), the controller 31 proceeds into step S26 to perform the saturation region determination and notification processing, and proceeds into step S27. In a case in which the controller 31 determines that the saturation region determination and notification processing is not to be performed (NO in step S25), the controller 31 proceeds into step S27.

The saturation region determination and notification processing in step S26 is similar to that described in the first embodiment with reference to FIG. 5, and thus the description is employed. Processing of and after step S27 is similar to that of steps S6 to S8 of FIG. 4, and thus the description is employed.

In this manner, in the second embodiment, the saturation region determination and notification processing is not performed in a case in which a saturation region is less likely to have occurred. This prevents the processing time from increasing.

As described above, the controller 31 of the console 3 determines whether a saturation region is present in a radiation image captured by radiographing a subject. In a case in which the controller 31 determines that a saturation region is present, the controller 31 notifies the user that the saturation region is present in the radiation image by means of display on the display 34 or sound output from the sound output unit 36.

This enables the user to easily recognize whether a saturation region is present in the radiation image captured by radiographing the subject. As a result, in a case in which the saturation region is present, the user is able to improve the radiographic conditions for subsequent radiography sessions, which prevents a patient from being continuously overexposed.

For example, the controller 31 notifies the user of the position of the saturation region present in the radiation image by means of display on the display 34, for example. This enables the user to recognize the position and size of the saturation region having occurred. The user is able to check whether re-radiography is necessary, and to easily improve the radiographic conditions for subsequent radiography sessions.

For example, the controller 31 determines whether the saturation region is present within the diagnostic target region of the radiation image, and in a case in which the controller 31 determines that the signal saturation region is present in the diagnostic target region, notifies the user that the saturation region is present in the diagnostic target region by means of display on the display 34 or sound output from the sound output unit 36. This enables the user to easily recognize whether the saturation region is included in the diagnostic target region of the radiation image. As a result, a radiation image not suitable for diagnosis because of an occurrence of a saturation region is prevented from being provided for diagnosis.

For example, in the case in which the controller 31 determines that the saturation region is present in the diagnostic target region, the controller 31 notifies the user of an alert concerning a radiographic failure by means of display on the display 34 or sound output from the sound output unit 36. This enables the user to immediately recognize that a radiographic failure is likely to occur in the case in which the saturation region is present, and prompts the user to check whether re-radiography is necessary.

For example, the controller 31 changes the method of notifying the user of an alert based on the area of the saturation region in the diagnostic target region of the radiation image. This enables the user to immediately recognize the degree of abnormality of the radiation image.

For example, the controller 31 derives an improved value of the radiographic conditions when re-radiographing the subject based on the saturation region present in the diagnostic target region and image information around the saturation region, and notifies the user of the derived improved value of the radiographic conditions or both the radiographic conditions for the radiation image and the improved value of the radiographic conditions by means of display on the display 34, for example. This enables the user to easily understand how to improve the radiographic conditions for subsequent radiography sessions.

For example, the controller 31 changes an algorithm to be applied when determining whether the saturation region is present in the diagnostic target region of the radiation image based on a part of the subject, and notifies the user of information about the applied algorithm and/or a region recognized by the algorithm as the diagnostic target region by means of display on the display 34, for example. This enables the user to recognize the applied algorithm and to check whether the region has not been falsely recognized as the diagnostic target region.

For example, the controller 31 acquires positional information about a defective pixel of the radiation detector having radiographed the radiation image, and determines whether a saturation region is present eliminating a region corresponding to the position of the defective pixel in the radiation image. This prevents the defective pixel from being falsely recognized as a saturation region.

For example, the controller 31 acquires information about at least one of a part of the subject, the radiographing direction, and the thickness of the subject, and controls whether the determination about a saturation region is to be performed based on the acquired information. This prevents the processing time from increasing in vain.

For example, the controller 31 acquires information about the irradiation dose when the radiation image is radiographed and information about the upper limit dose of the radiation detector used for radiographing the radiation image, and controls whether the determination about a saturation region is to be performed based on the information about the irradiation dose and the information about the upper limit dose of the radiation detector as acquired. This prevents the processing time from increasing in vain.

For example, in a case in which the controller 31 determines that a saturation region is present in the radiation image, the controller 31 causes the storage to store the radiation image, the information indicating the position of the saturation region, and the radiographic conditions for the radiation image in association with each other. The radiation image in which the saturation region is present is helpful for educating radiographers later.

The description in the above embodiments is a preferable example of the present invention, and this is not a limitation.

For example, the above embodiments have been described using the case in which the console 3 has the functions as the radiographic failure determination support device as an example, but the radiographic failure determination support device may be a device separate from the console 3. The storage that stores a radiation image in which a radiographic failure has occurred may be included in the console 3.

The above description discloses the example of using a hard disk, a semiconductor nonvolatile memory, or the like as a computer-readable medium for the program according to the present invention, but this is not a limitation. A portable recording medium such as a CD-ROM may be applied as another computer-readable medium. Carrier waves are also applied as a medium that provides data about the program according to the present invention via a communication network.

In addition, detailed configuration and detailed operation of each device constituting the medical image system can also be changed within the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiographic failure determination support device comprising:
   a determiner that makes a determination about whether a signal saturation region is present in a radiation image captured by radiographing a subject; and
   a notifier that, in a case in which the determiner determines that the signal saturation region is present in the radiation image, notifies a user that the signal saturation region is present in the radiation image;
   wherein
      the determiner determines whether the signal saturation region is present in a diagnostic target region of the radiation image, and
      in a case in which the determiner determines that the signal saturation region is present in the diagnostic target region, the notifier notifies the user that the signal saturation region is present in the diagnostic target region.

2. The radiographic failure determination support device according to claim 1, wherein the notifier notifies the user of a position of the signal saturation region present in the radiation image.

3. The radiographic failure determination support device according to claim 1, wherein in the case in which the determiner determines that the signal saturation region is present in the diagnostic target region, the notifier notifies the user of an alert concerning a radiographic failure.

4. The radiographic failure determination support device according to claim 3, wherein the notifier changes a method of notifying the user of the alert based on an area of the signal saturation region in the diagnostic target region of the radiation image.

5. The radiographic failure determination support device according to claim 1, further comprising:
   a deriver that derives an improved value of a radiographic condition when re-radiographing the subject based on the signal saturation region present in the diagnostic target region and image information around the signal saturation region, wherein
   the notifier further notifies the user of the improved value of the radiographic condition as derived or both the radiographic condition for the radiation image and the improved value of the radiographic condition.

6. The radiographic failure determination support device according to claim 1, wherein
   the determiner changes an algorithm to be applied when determining whether the signal saturation region is present in the diagnostic target region of the radiation image based on a part of the subject, and
   the notifier further notifies the user of information about the algorithm applied by the determiner and/or a region recognized by the algorithm as the diagnostic target region.

7. The radiographic failure determination support device according to claim 1, wherein the determiner acquires information about a position of a defective pixel of a radiation detector having radiographed the radiation image, and performs the determination eliminating a region corresponding to the position of the defective pixel in the radiation image.

8. The radiographic failure determination support device according to claim 1, further comprising:
   a determination controller that acquires information about at least one of a part of the subject, a radiographing direction, and a thickness of the subject, and controls whether the determination is to be performed by the determiner based on acquired information.

9. The radiographic failure determination support device according to claim 1, further comprising:
   a determination controller that acquires information about an irradiation dose when the radiation image is radiographed and information about an upper limit dose of a radiation detector used for radiographing the radiation image, and controls whether the determination is to be performed by the determiner based on the information about the irradiation dose and the information about the upper limit dose of the radiation detector as acquired.

10. The radiographic failure determination support device according to claim 1, further comprising:
    a storage controller that, in the case in which the determiner determines that the signal saturation region is present in the radiation image, causes a storage to store the radiation image, information indicating a position of the signal saturation region, and a radiographic condition for the radiation image in association with each other.

11. A non-transitory computer-readable recording medium storing a program that causes a computer to function as:
    a determiner that determines whether a signal saturation region is present in a radiation image captured by radiographing a subject; and
    a notifier that, in a case in which the determiner determines that the signal saturation region is present in the radiation image, notifies a user that the signal saturation region is present in the radiation image;
    wherein
       the determiner determines whether the signal saturation region is present in a diagnostic target region of the radiation image, and
       in a case in which the determiner determines that the signal saturation region is present in the diagnostic target region, the notifier notifies the user that the signal saturation region is present in the diagnostic target region.

* * * * *